United States Patent [19]

Heidelberg et al.

[11] Patent Number: 4,769,580
[45] Date of Patent: Sep. 6, 1988

[54] ELECTROMAGNETIC LINEAR DRIVE

[76] Inventors: Götz Heidelberg, Am Hügel 16, D-8130 Starnberg-Percha; Andreas Gründl, Haseneystrasse 20, D-8000 München 70; Peter Rosner, Waltherstrasse 16, D-8000 München 2, all of Fed. Rep. of Germany

[21] Appl. No.: 946,144

[22] Filed: Dec. 23, 1986

Related U.S. Application Data

[63] Continuation of Ser. No. 647,705, Sep. 5, 1984, abandoned.

[30] Foreign Application Priority Data

Sep. 5, 1983 [DE] Fed. Rep. of Germany ....... 3331952

[51] Int. Cl.$^4$ ............................................. H02K 41/03
[52] U.S. Cl. ........................................ 318/135; 310/12; 104/292
[58] Field of Search .......................... 318/37, 38, 135; 310/12; 104/292, 294, 295, 298

[56] References Cited

U.S. PATENT DOCUMENTS

| | | | |
|---|---|---|---|
| 3,803,466 | 4/1974 | Starkey | 318/135 X |
| 4,234,838 | 11/1980 | Langley et al. | 318/135 X |
| 4,238,715 | 12/1980 | Parsch et al. | 318/135 |
| 4,455,512 | 6/1984 | Cornwell | 318/135 |
| 4,633,148 | 12/1986 | Prucher | 318/135 |
| 4,675,582 | 6/1987 | Hommes | 318/135 X |

FOREIGN PATENT DOCUMENTS 2341761 8/1977 Fed. Rep. of Germany.

Primary Examiner—Mark O. Budd
Assistant Examiner—Judson H. Jones
Attorney, Agent, or Firm—Hubbard, Thurman, Turner & Tucker

[57] ABSTRACT

An electromagnetic linear drive is disclosed which includes a stator divided into motor elements and which constitutes a path of movement for a movable vehicle. Each motor element includes an energy supply unit adapted to be switched on and off individually and a power control unit with which a memory is associated. The memory is capable of storing a number of different running speed control signals corresponding to a number of predetermined running characteristics. The speed control signals control each power control unit so that it will supply power to its associated motor element, resulting in a locally controlled speed of the vehicle which runs over the motor element. The locally controlled speed corresponds to the running characteristics selected. This locally controlled speed lies in the range from running speed zero to a given locally specific maximum speed predetermined individually for each respective motor element.

8 Claims, 3 Drawing Sheets

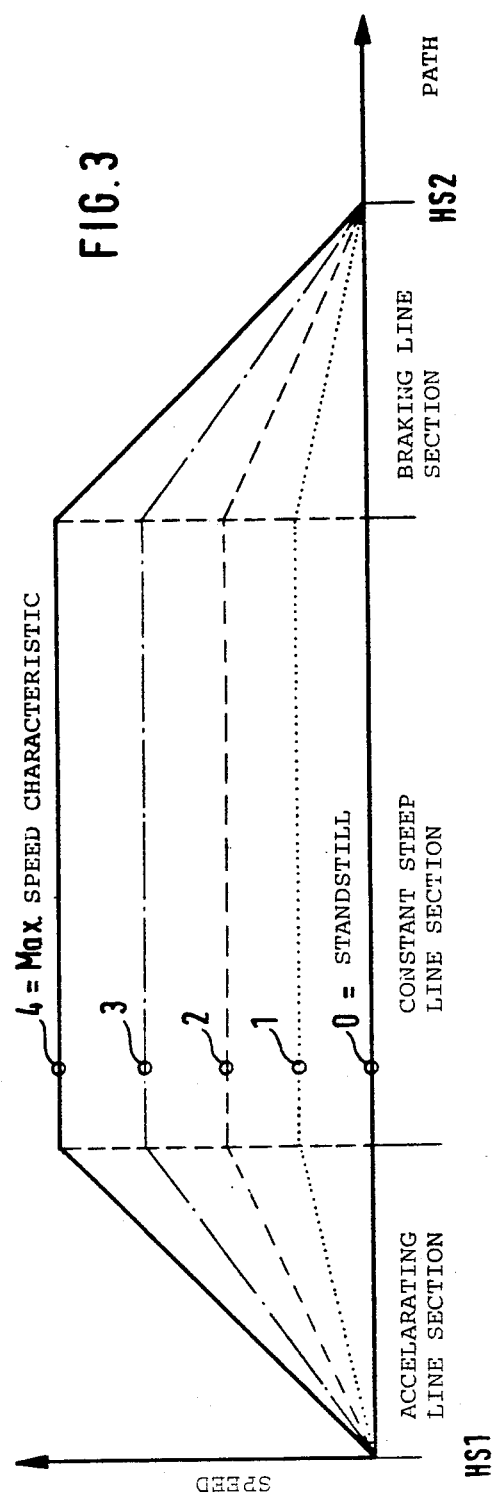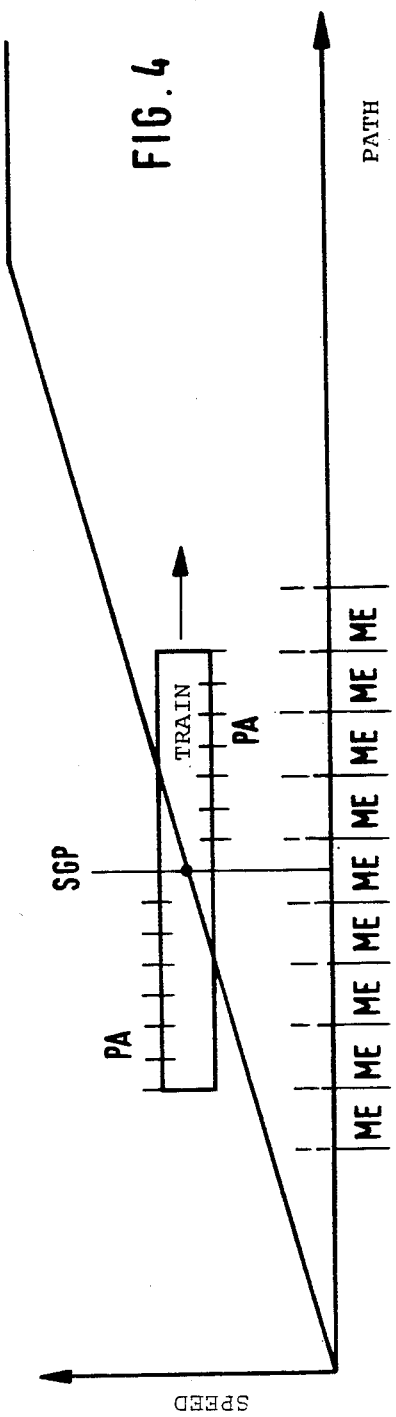

ELECTROMAGNETIC LINEAR DRIVE

This application is a continuation of application Ser. No. 647,705, filed Sept. 5, 1984, now abandoned.

BACKGROUND OF THE INVENTION

The invention relates to an electromagnetic linear drive and more particularly to a computerized electromagnetic linear drive which includes a computerized control center for controlling a stator which constitutes a path of movement for a vehicle and which is equipped with current conductors and divided into a plurality of motor elements. A movable vehicle which is equipped with magnets, preferably permanent magnets, cooperates with the stator to provide an electromagnetic linear drive. A plurality of energy supply units, each including a power control unit, is associated with each individual motor element and each is adapted to be switched on and off individually, preferably by sensors disposed along the path of movement which are influenced by the vehicle.

An electromagnetic linear drive wherein the vehicle itself effects self-control as regards the switch-on and switch-off of individual sections of the stator by means of sensors disposed along the path of movement which are influenced by the vehicle is known in the prior art. Known linear drive motor train systems are controllable, if desired, fully automatically, by a control center computer preferably coordinated with the entire path of movement of the vehicle. Individual running speed control signals must be applied to the individual sections of either the stator or the motor elements in order to obtain a desired running characteristic along the path of movement. On one hand, these signals must correspond to a basic running characteristic which includes stopping stations and line sections requiring slow-down, such as curves, as well as accelerating line sections, line sections for constant speed movement, and braking line sections. On the other hand, the basic running program must be variable as regards the level of the desired traveling speed so as to permit adaptation to varying demands.

By utilizing a circuit arrangement not only in the control center but also in each motor element a rather great expenditure of funds is involved to supply the individual motor elements with individual, variable running speed control information. As the number of motor elements is typically great and the path of movement long, this control is rather complicated and the costs are quite high. Besides, a great number of quick data lines are required to supply individual, varying speed control information to the individual motor elements. This is another factor contributing to the high expenditure and great costs involved in such a train system.

It is, therefore, an object of the invention to provide an improved electromagnetic linear drive of the type specified initially such that the running characteristic and running speed control can be effected at considerably less expenditure.

This object is met, in accordance with the invention, in that a memory device is associated with the power control unit of each motor element, in which memory different running speed control signals may be stored corresponding in number to the number of predetermined, selectable running programs. These running speed control signals are utilized to control the respective energy supply unit which supplies power to a motor element, resulting in a locally specific speed of the vehicle or train which runs over that motor element. The locally specific speed corresponds to the running program selected and lies in a range of from running speed zero to a locally specific maximum speed which is preset individually for each motor element. Advantageous further developments are recited in the claims.

A number of different running programs, each designated by a selected program number are fixed for the electromagnetic linear drive according to the present invention. These program numbers are stored in the memories of the individual motor elements. In each motor element each of these program numbers corresponds to a certain stored nominal speed. In different motor elements identical program numbers may be associated with different nominal speeds.

All that is needed with the present invention to produce a pattern of the running characteristic, i.e. a nominal speed as a function of the path of movement, is to report the desired program number to the individual motor elements. Each motor element then associates a particular nominal speed from the stored plurality of nominal speeds to the program number selected. The sum of these selected speeds of the individual motor elements provides the pattern of the overall running characteristic of the linear drive. If this running characteristic is observed, the arrangement found along the path of movement will produce the desired running conditions as to acceleration or speed. Of course, it should be obvious that a maximum speed which can be called up is limited to one of the program numbers. Any deviation from the selected pattern of the running characteristics can be eliminated by active control of the individual motor elements effecting a comparison between the nominal speed of the motor elements associated with a respective program number and the actual speed of the vehicle above this motor element measured by the sensors.

The term "vehicle" is used in the present context to designate not only an individual vehicle but also a train composed of a plurality of vehicles.

The running program control mentioned above affords particular advantage in cooperation with an electromagnetic linear drive which includes equal performance motor elements, (all motor elements are designed for the same maximum performance) such as described in co-pending U.S. Patent Application Ser. No. 647,706, entitled "An Electromagnetic Linear Drive", filed of even date herewith. The electromagnetic linear drive disclosed in this co-pending application has each of its motor elements designed for equal maximum performance. Motor elements of different lengths are provided and the length of each motor element is determined by the local need for maximum performance per unit length. The local need which exists at the place of a specific motor element is determined in accordance with a predetermined maximum speed characteristic along the path of movement. A linear drive which comprises such equal maximum performance motor elements can be controlled especially advantageously by the method described herein. The input of different running program numbers into the memories of individual motor elements permits the selection of different running characteristics with running speeds below the maximum speed. The type of running program control described, by the way, is very well suited also for a rotary motor having a stator divided into stator sections which are adapted to be switched on and off by the rotor by means of sensors provided at the stator sections as described in the prior art.

Electromagnetic linear drives of the type specified herein normally comprise motor elements which are much shorter than a typical vehicle or train. For this reason the vehicle or train is always located above a plurality of motor elements. In accelerating or braking line sections this means that the head and tail of the vehicle, for example, are controlled to different speeds by the respective motor elements underneath them. By cooperation of all motor elements located under the respective vehicle, a nominal speed point is developed along the vehicle. At this point the vehicle speed corresponds to the speed which is controlled by the underlying motor element. This nominal speed point of the vehicle, however, depends on the load, i.e. on the weight added to the vehicle. This may have a disadvantageous influence, for example, at stops if the nominal speed point of the vehicle is displaced along the braking line sections in response to the added weight. Thus it will become more difficult to stop the vehicle exactly at a desired point. In this respect a preferred embodiment of the invention, as described herein provides a remedy. With this embodiment the motor element performance is corrected in each motor element in accordance with the respective desired running program. The correction takes into consideration not only the distance which the vehicle portion located above the motor element at issue has from the nominal speed point of the vehicle but also whether the vehicle portion located above this motor element is in front of or behind the nominal speed point, as taken in the direction of movement. By way of this correction the vehicle portions lying in front of the nominal speed point are given a lower speed by the motor elements underneath than would correspond to the selected running program number of a respective motor element. The opposite happens with vehicle portions located behind the nominal speed point. The memory associated with each motor element helps to determine how many units of vehicle portion have passed the respective motor element and where each of the vehicle portions which happens to be passing the motor element is located with reference to the nominal speed point. This speed correction along the length of the vehicle provides a nominal speed control with regard to the nominal speed point of the vehicle which is independent of the added weight. Thus it is easy to have the vehicle always stop with its nominal speed point exactly at the desired place of the stop. Moreover, the control correction described above also permits a constant thrust to be adjusted for an entire train so that no longitudinal forces will occur in the train.

Preferably the sensors provided for self-control of the driving stator magnetic field by the vehicle are used to count the vehicle portions passing above a motor element. Further details may be seen in the applicant's own DE-OS No. 30 42 497, the disclosure of which is especially referred to in this respect.

If the correction value for vehicle portions lying in front of and behind the nominal speed point is determined by counting the vehicle portions passing a motor element, and if the correction is made in accordance with the respective counting value, a train length signal may be applied, as specified herein so as to effect a train length correction. The train length signals applied to the individual motor elements then may be used to evaluate the counting value drawn upon for correction in response to the respective train length. In this manner the speed of the individual train or vehicle portions always may be corrected with reference to the same nominal speed point, regardless of the train length, e.g., to the longitudinal center of the train or vehicle.

It is possible to connect a control center to the individual motor elements in such a manner that the control center has access to the memory of each individual motor element. This requires a great expenditure as to data lines. With a preferred embodiment of the present invention, therefore, the memories associated with at least a number of motor elements are interconnected by a single data bus. The necessity of a decoder in each element is avoided by coupling the same program number code to each memory connected to this common data bus.

For a longer path of movement the memories of the motor elements would have to be designed so as to accommodate a great number of running program numbers if a sufficiently great flexibility is desired with regard to the selectably running characteristics. In this respect a preferred further development of the invention as recited herein provides for a combination of the motor elements in several line sections. The memories of the motor elements of each line section are commonly connected to a data bus which is coordinated for a particular line section. The memories of the motor elements of each line section comprise a certain number of line section running program numbers. As different line sections may be controlled by different line section running program numbers, there is a great variety of different combinations of overall line running characteristics which are available utilizing a relatively small number of line section running program numbers.

With the present invention, there is no need to connect the control center with each individual line section by a separate data bus because it is provided in accordance with a preferred further development of the invention, that the individual line sections are associated with different subcenters preferably at the stopping stations. The individual subcenters may be connected to series with the control center by a single data bus. The data information transmitted by the a control center to the subcenters comprises not only the line section running program number but also a subcenter code in order that the control center may have direct access to the individual subcenters. If one subcenter feeds several line sections, the data information supplied by the control center preferably contains additional line section selection data. The control center transmits control information to the subcenters, and each respective subcenter may use its decoder to select the information destined for that particular subcenter. This information is converted into information which can be understood by the line sections, and the converted information is applied to all memories of the line section in question.

In this manner very few data lines and relatively small memories associated with each motor element are sufficient to permit a great variety of overall line running characteristics.

If the control center should fail, each subcenter can operate in autarchic fashion to select a running program number which was set previously for this instance so that the running operations still may be continued.

Especially advantageous is a linear drive which combines the running program control described above with the concept of the equal performance motor elements in accordance with the aforementioned U.S. Patent Application Ser. No. 647,706, filed of even date herewith and entitled "An Electromagnetic Linear Drive" and/or with a path of movement switchover in accordance with the co-pending U.S. Patent Application Ser. No. 647,708, filed of even date herewith and having the same title and/or the energy supply unit comprising monophase controllers in accordance with the co-pending U.S. Patent Application Ser. No. 647,707, entitled "An Energy Supply Unit For A Multi-Phase Electromagnetic Linear Drive", filed of even date herewith.

BRIEF DESCRIPTION OF THE DRAWINGS

The invention and further developments of the invention will be described further, by way of a preferred embodiment, with reference to the accompanying drawings, in which:

FIG. 3 presents an example of a speed characteristic along a running line section; and FIG. 4 is a presentation to explain the control of the vehicle speed with reference to a nominal speed point of the vehicle.

DETAILED DESCRIPTION OF THE INVENTION

Figure 1:
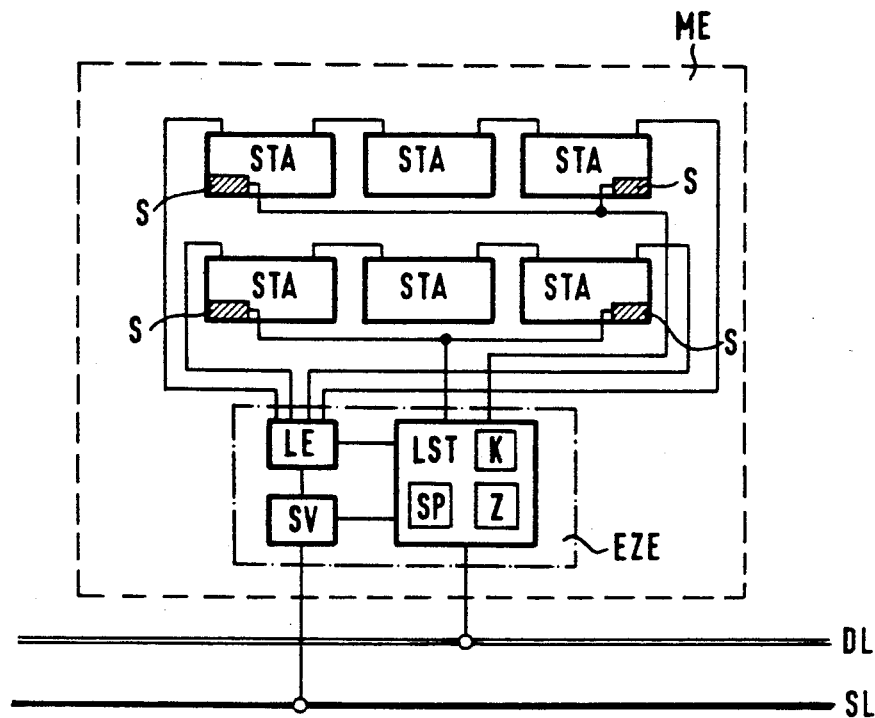
FIG. 1 presents an embodiment of a single motor element of an electromagnetic linear drive according to the invention.

FIG. 1 shows an individual motor element ME of an electromagnetic linear drive. This motor element belongs to a running line section which includes a left stator and a right stator. It is assumed, for example, that the upper three stator elements STA shown in FIG. 1 belong to the left stator while the lower three stator elements STA belong to the right stator. A motor element comprising three pairs of stator elements will be utilized as an example; however, those skilled in the art will appreciate that the number of pairs also may be different. Moreover, this number may differ from one motor element to the next if the motor element ME is part of a linear drive which includes equal performance motor elements as disclosed in co-pending U.S. Application Ser. No. 647,706, filed of even date herewith.

The three stator elements STA of the left stator on one hand, and the three stator elements STA of the right stator, on the other hand, each are connected in series and may be fed with drive energy by an energy unit LE. The magnetic fields generated in the stator elements STA cooperate with the magnets provided at the vehicle which are preferably designed as permanent magnets, to form a linear drive. The two outer stator elements STA of the motor element ME, both of the left and right stator are each provided with a sensor S preferably in the form of a Hall effect sensor disposed beside the stator. Control means, preferably in the form of control permanent magnets, are provided at the vehicle for cooperation with the sensors S. As soon as a vehicle enters a motor element, the sensors S switch on the energy unit LE by means of a power control unit LST. Examples of controlled energizing systems suitable for use are set forth in U.S. Pat. No. 3,803,466 issued Apr. 9, 1974 to Ronald C. Starkey. When the vehicle leaves this motor element, the power control unit LST serves to switch off the energy unit LE. In this manner each motor element receives energy only as long as a vehicle is passing over the motor element.

The energy unit LE and the power control unit LST are each supplied with electrical energy from a current supply unit SV.

A memory SP, a counter Z, and a correcting means K are also associated with the power control unit LST. The memory SP stores running program numbers which may be called up by a data line DL to which the power control unit LST is connected. A predetermined running speed control signal is associated with each running program number in memory SP, and this signal causes the power supply the stator elements STA of the unit LE to supply power to a given motor element. Different running speed control signals may be coordinated with the same running program number in the memories of different motor elements. Thus different motor element performance may be obtained by controlling the individual memories utilizing the same running program number in the various motor elements.

Figure 2:
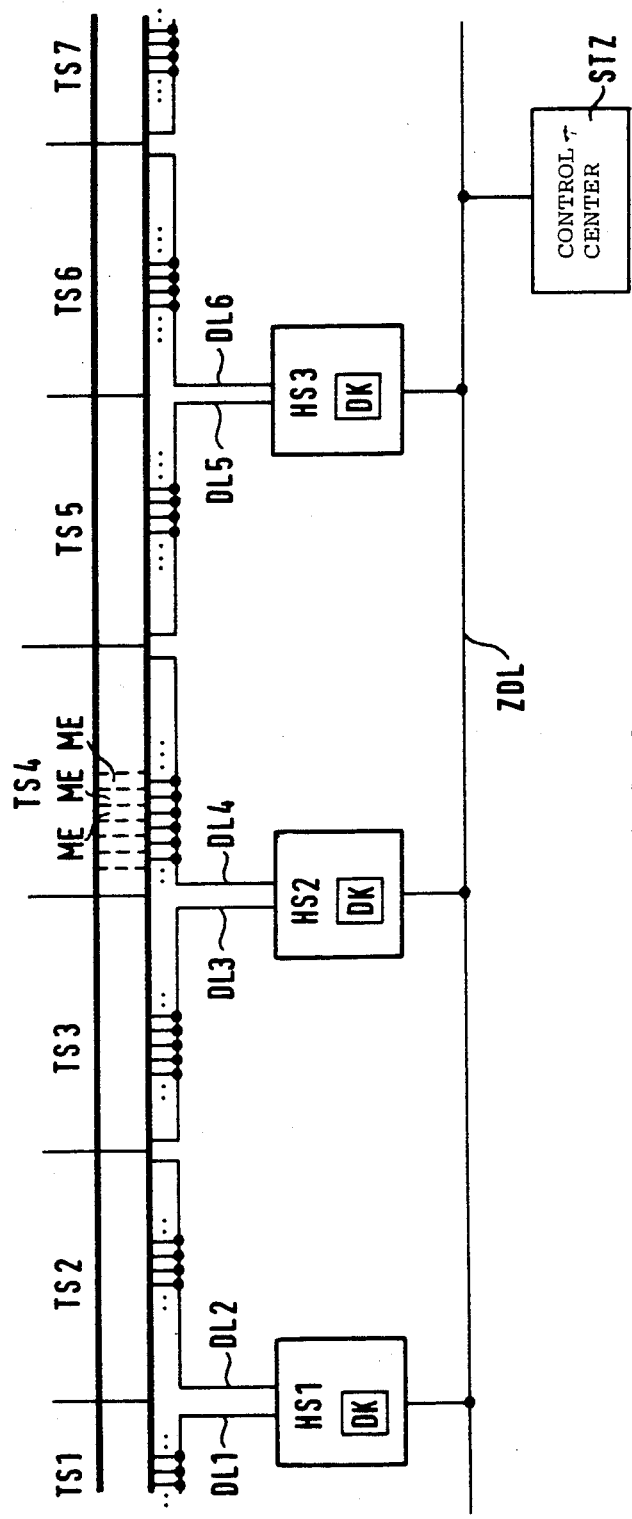
FIG. 2 presents an embodiment of a plurality of motor elements according to FIG. 1 combined to form running line sections.

FIG. 2 shows a section of a path of movement composed of a plurality of motor elements ME as shown in FIG. 1. The overall path of movement is divided into individual line sections TS1, TS2, TS3, . . . . In the embodiment shown in FIG. 2 two line sections TS are associated with each stopping station HS1, HS2, HS3. The stopping stations include subcenters HS for line sections TS, and these subcenters are connected to the motor elements ME of a respective line section TS by a data line DL. For example, line sections TS3 and TS4 are connected to stop station HS2 by data lines DL3 and DL4, respectively. Each data line DL comprises a number of taps corresponding to the number of motor elements of the associated line section TS. These taps provide the connection to the data line DL of the memories SP of the individual motor elements ME disposed one behind the other along the line section TS under consideration.

The stopping stations furnished with the subcenters HS are connected to a control center STZ by a central data line ZDL. Here again a single central data line ZDL or a single central data bus is sufficient for coupling of the individual stopping stations by means of taps.

The control center which normally includes a computer means that preferably controls the entire traveling distance includes a running program number generator and a subcenter or stopping station selection code generator. The individual stopping stations HS1, HS2, HS3 are each furnished with a decoder DK. Control information supplied by the control center STZ to the central data line ZDL comprises a stopping station code signal which is recognized by the decoder DK of a selected stopping station. This stopping station uses its decoder DK to select the control information destined for this station and inputs the same into a converter which applies running program numbers to the corresponding line sections TS in accordance with the control information received from the control center STZ. If a plurality of line sections TS are provided for stopping stations HS1, HS2, or HS3, it is possible to have control center STZ furnish information to the stopping station selected for identification on the line section TS to be controlled. Also, a number of running program data greater than the number of running program numbers stored in the motor elements may be coupled to the stopping stations, and in the converter of the respective stopping station selected these may generate selected running program numbers for the individual line sections TS belonging to this particular stopping station.

FIG. 3 presents an example of a running speed characteristic between two stopping stations HS1 and HS2. The vehicle leaves stopping station HS1 by an accelerating line section which is followed by a line section of steady-state or constant speed movement, and this in turn is followed by a braking line section in front of the second stopping station HS2. For the sake of simplicity it is assumed with this speed characteristic that no intermediate braking or acceleration is required between the accelerating line section and the braking line section as would be required, for example, because of curves or descending or rising line sections.

The example shown in FIG. 3 comprises five running speed programs marked by program numbers 0 to 4. In this case the memories of the motor elements belonging to the line section shown would store 5 program numbers.

FIG. 4 serves for explanation of a possibility of correction by means of which the outputs of all motor elements ME located under the vehicle or train are tuned to the nominal speed point SGP of the vehicle. Beginning with the tip of the vehicle, the sensors S (in FIG. 1) generate vehicle length counting signals. The pole pitch PA of the magnets of the vehicle preferably may be utilized for counting, the sensors S of each motor element emit a signal to be counted upon each pole change of the vehicle moving over the motor element. The counter Z (in FIG. 1) counts in increments per vehicle length unit in a motor element which is disposed underneath the passing vehicle. The resulting counting value discloses how many longitudinal units of the vehicle have passed the motor element under consideration. This permits a conclusion to be drawn as to the position of the vehicle portion located above the motor element under consideration with respect to the nominal speed point SGP of the vehicle. A correcting means K (in FIG. 1) may be used to correct the motor element performance as compared to the output which would correspond to this motor element due to the running program number called up. As regards the accelerating line section shown in FIG. 4, for example, it is thus possible to have the individual motor elements impart a lower speed to those train sections which lie in front of the nominal speed point SGP and a higher speed to those train sections which lie behind the nominal speed point SGP, rather than having the individual motor elements ME apply the speed in accordance with the uncorrected running program number.

What is claimed is:

1. An electromagnetic linear drive system comprising in combination:

at least one magnet mounted upon a vehicle for movement;

a path of movement for the said vehicle including a stator means for coacting with at least one magnet of the vehicle for forming a linear drive, said stator means being divided into a plurality of stator segments;

a plurality of means for energizing the said stator means, each of the said energizing means being operatively connected to one of the plurality of stator segments and being responsive to running speed control signals for controlling the energy supplied to the particular stators segment;

a control center including means for selecting a running speed code signal from a plurality of running speed code signals;

each of the said energizing means having associated thereto a memory means operatively connected to the control center for storing a plurality of running speed control signals, each running speed control signal being selectable by receiving from the control center one of the running speed code signals, wherein the selected running speed code signal is commonly transmitted to the memory means of all stator segments and the energy controlled by a particular running speed code signal is individually determined for each of the stator segments;

whereby one of a plurality of speed patterns for the movement path are produced from the selected running speed code signal.

2. The electromagnetic linear drive according to claim 1 wherein said path of movement includes at least one accelerating line section and at least one braking line section, wherein each stator section comprises a plurality of stator segments, the length of the plurality of stator segments of each of said line sections being substantially shorter than said vehicle, wherein a selected point on the longitudinal axis of said vehicle is chosen as a nominal speed point, and wherein said energizing means further includes a counter means responsive to vehicle length unit signals for counting longitudinal part units of said movable vehicle relative to said nominal speed point wherein the memory means has running speed correction values each coordinated with a pre-determined count, and a correcting means responsive to the running speed correction value from said memory means selected in response to a respective count of the counter means, for correcting the selected running speed control signal from the memory means related to the nominal speed point in response to the respective running speed correction value.

3. The electromagnetic linear drive according to claim 2, further including means for storing a vehicle length signal operatively connected to the correcting means, said correcting means being arranged for evaluating the count of the counter means responsive to the vehicle length signal.

4. The electromagnetic linear drive according to claim 1, wherein a plurality of stator segments is combined into a line section, and further including a common data line operatively connecting the memory means of each of the stator segments of the line section to the control center means for commonly transmitting a selected one of said running speed code signals to the memory means of all stator segments of the line section, a locally specific stator segment speed being associated to each one of the commonly transmitted running speed code signals.

5. The electromagnetic linear drive according to claim 4, further including a plurality of line sections combined into a plurality of line sections groups, the data lines of each of the line sections of each line sections group being operatively connected to one of a plurality of subcenters, the subcenters being operatively connected commonly to the control center means through a common central data line, said control center means comprising a subcenter selection code generator and a line section running program number generator, and each subcenter comprising a subcenter selection code decoder and a line section running program converter for converting the line section running program number into running speed code signals for each of the line sections of the respective line sections group.

6. An integrated synchronous motor control system comprising in combination:
   a movable vehicle having a magnet means mounted thereon for movement therewith;
   a stationary path including a plurality of motor elements having stator elements coacting with the magnet means for forming an electromagnetic linear drive for the vehicle, each motor element including a plurality of the stator elements, an energizing means connected to the plurality of stator elements for energizing the stator elements, a switching means connected to the energizing means for switching the energizing means on and off; a power control means connected to the energizing means for controlling the energy outputs; and a memory means for storing a plurality of running speed program numbers and corresponding running speed control signals for nominal speeds of vehicle path speed patterns,
   a control center including a running program number selector means for generating a desired running speed program number selection signal; and
   a data line connecting the control center to the memories and power control means of the plurality of motor elements, said memories responsive to the program number selection signal for providing power control signals to the power control means, and said power control means responsive to the power control signals for controlling the power outputs of the plurality of energizing means, and the energizing means responsive to the switching means for supplying sequentially corresponding power to the plurality of motor elements' stators for producing the vehicle speeds of the selected program running speed pattern.

7. An integrated synchronous motor control system according to claim 6 wherein said vehicle comprises a plurality of longitudinal portions having magnets and sensor detectors, and each motor element further includes a counter means for counting the number of vehicle portions passing over the motor element, and correction means connected to the counter means for generating running power correction signals for the motor element's energizing means for correcting the motor element's performance as compared to the output which would correspond to the motor element owing to the running program number called up.

8. An integrated synchronous motor control system according to claim 6 wherein the control center comprises:
   a central control center having signal generators for generating control information signals including a control subcenter identification code signal and a running program number identification signal, and a central data line connected to the central control center generators and having a plurality of taps; and
   wherein the system further includes: a plurality of control subcenters connected to the taps of the central data line, each subcenter having a decoder for recognizing the subcenter's identifying code signal, a converter responsive to a decoder code recognition signal for receiving the running program number identification signal and generating a corresponding running program number designating signal, and a data line connected to the control subcenter's converter and having a plurality of taps connected to a selected number of the plurality of motor elements' data lines for defining a path section of the stationary path, wherein the plurality of control subcenter's data lines divide the stationary path into a plurality of path sections and their converters output the running program number designating signals into the motor elements' data lines of their respective path sections.

* * * * *